5 Sheets—Sheet 4.
G. CROMPTON & H. WYMAN.
Loom.
No. 217,589. Patented July 15, 1879.
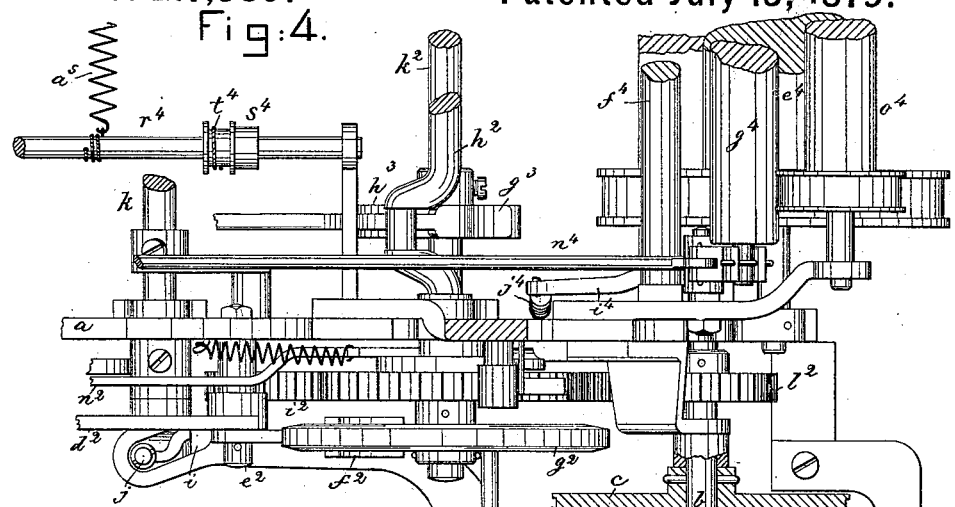
Fig. 4.
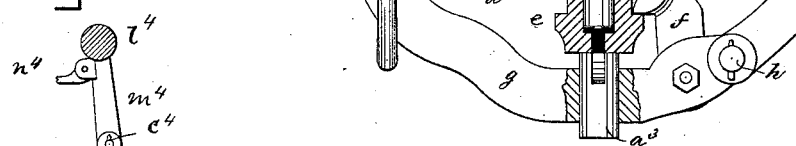
Fig. 11.
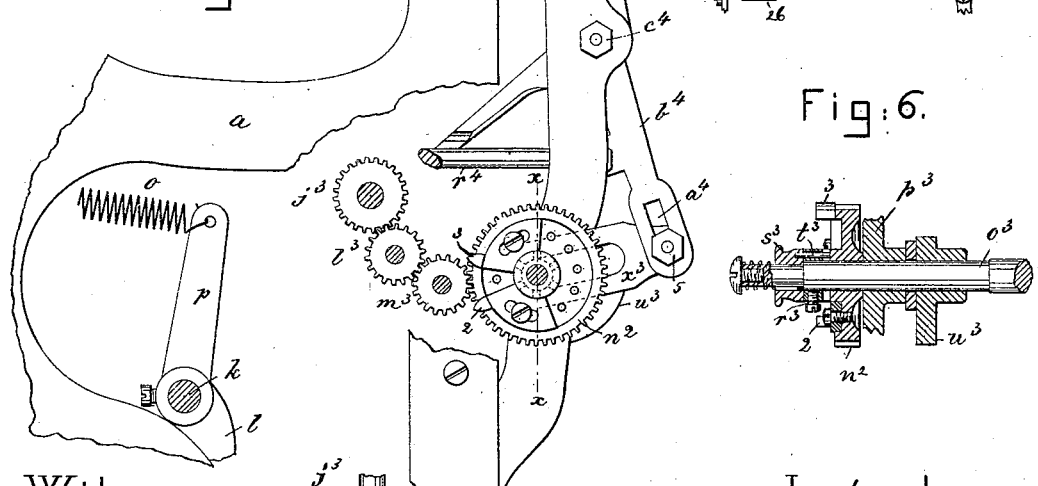
Fig. 5.
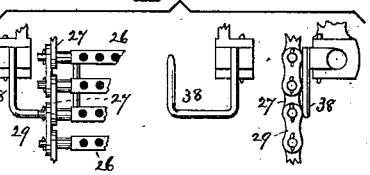
Fig. 14.
Fig. 6.
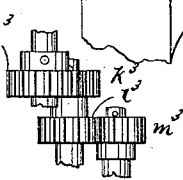
Witnesses.
A. Hunerwadel
N. E. Whitney
Inventors.
George Crompton, and
Horace Wyman.
by Crosby Gregory
Attys
N. PETERS, PHOTO-LITHOGRAPHER, WASHINGTON, D. C.

5 Sheets—Sheet 5.
G. CROMPTON & H. WYMAN.
Loom.
No. 217,589. Patented July 15, 1879.
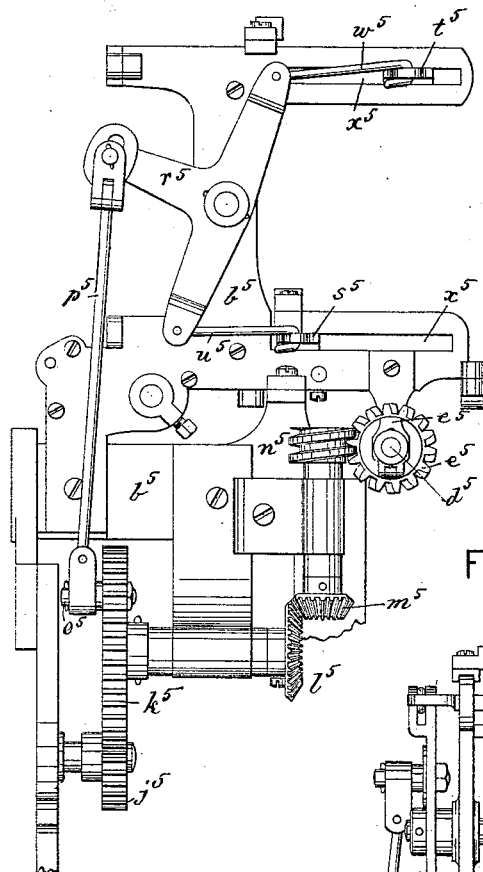
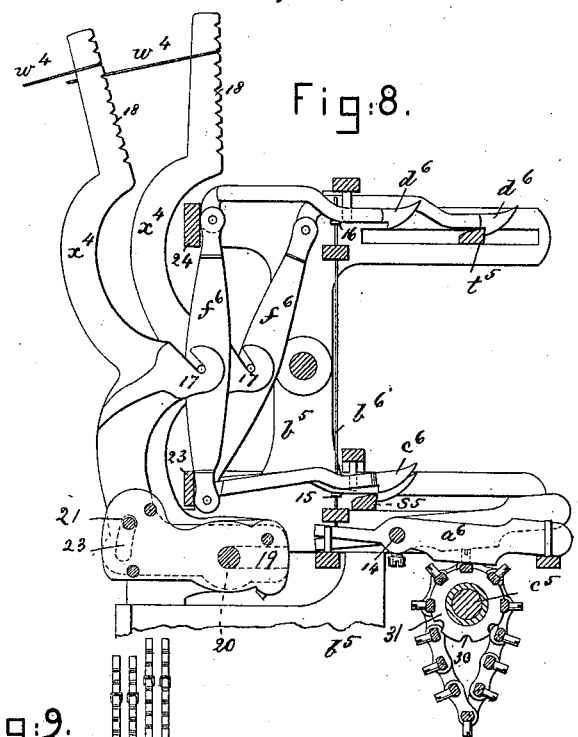
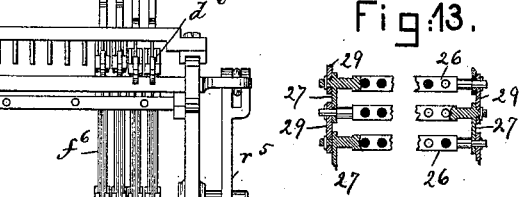
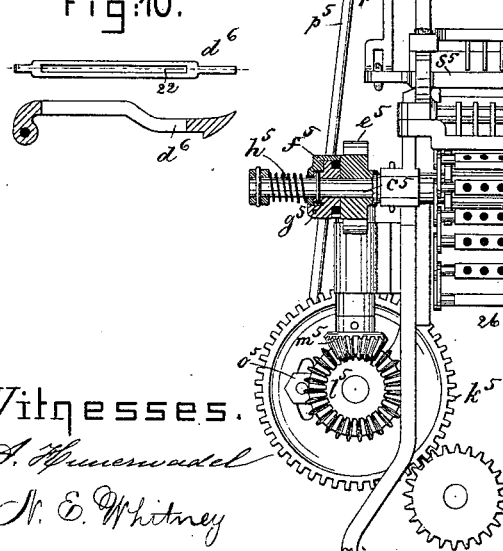
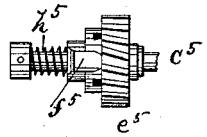
Witnesses.
A. Hunnewadel
N. E. Whitney
Inventors.
George Crompton and
Horace Wyman.
by Crosby & Gregory Attys

UNITED STATES PATENT OFFICE.

GEORGE CROMPTON AND HORACE WYMAN, OF WORCESTER, MASSACHUSETTS, ASSIGNORS TO SAID CROMPTON.

IMPROVEMENT IN LOOMS.

Specification forming part of Letters Patent No. 217,589, dated July 15, 1879; application filed February 20, 1879.

*To all whom it may concern:*

Be it known that we, GEO. CROMPTON and HORACE WYMAN, of Worcester, county of Worcester, State of Massachusetts, have invented an Improvement in Looms, of which the following description, in connection with the accompanying drawings, is a specification.

This invention relates to looms, and is exemplified in a loom for weaving Turkish toweling; but parts thereof may be applied to looms for weaving other fabrics.

Our invention has for one of its objects to improve that class of harness-operating mechanism known as the "dobby," wherein the harness-frames are elevated by hooked jacks and depressed by springs.

Under this head of our invention we have provided certain notched levers, upon which are pivoted arms or connections, each of which has joined with it two notched jacks; and the pattern-surface, through the intervention of a single finger and a single rod for each two jacks, operates them to rise or fall, as it is desired that the elevators miss or catch the jacks.

Our invention also has for its object, at the proper or desired intervals, to automatically throw forward in unison certain rollers or beams located between the warp and cloth beams, to cause them, without interfering with the motion of the warp or cloth-beams, to suddenly draw a certain fixed quantity of the warp through the eyes of the harness and reed-spaces, to thereby form warp-spaces without weft, suitable for the production of fringe.

Under this head we will first describe our invention as applicable to weaving that class of towels known as "Turkish," and afterward will describe the production of other well-known toweling.

Figure 1:
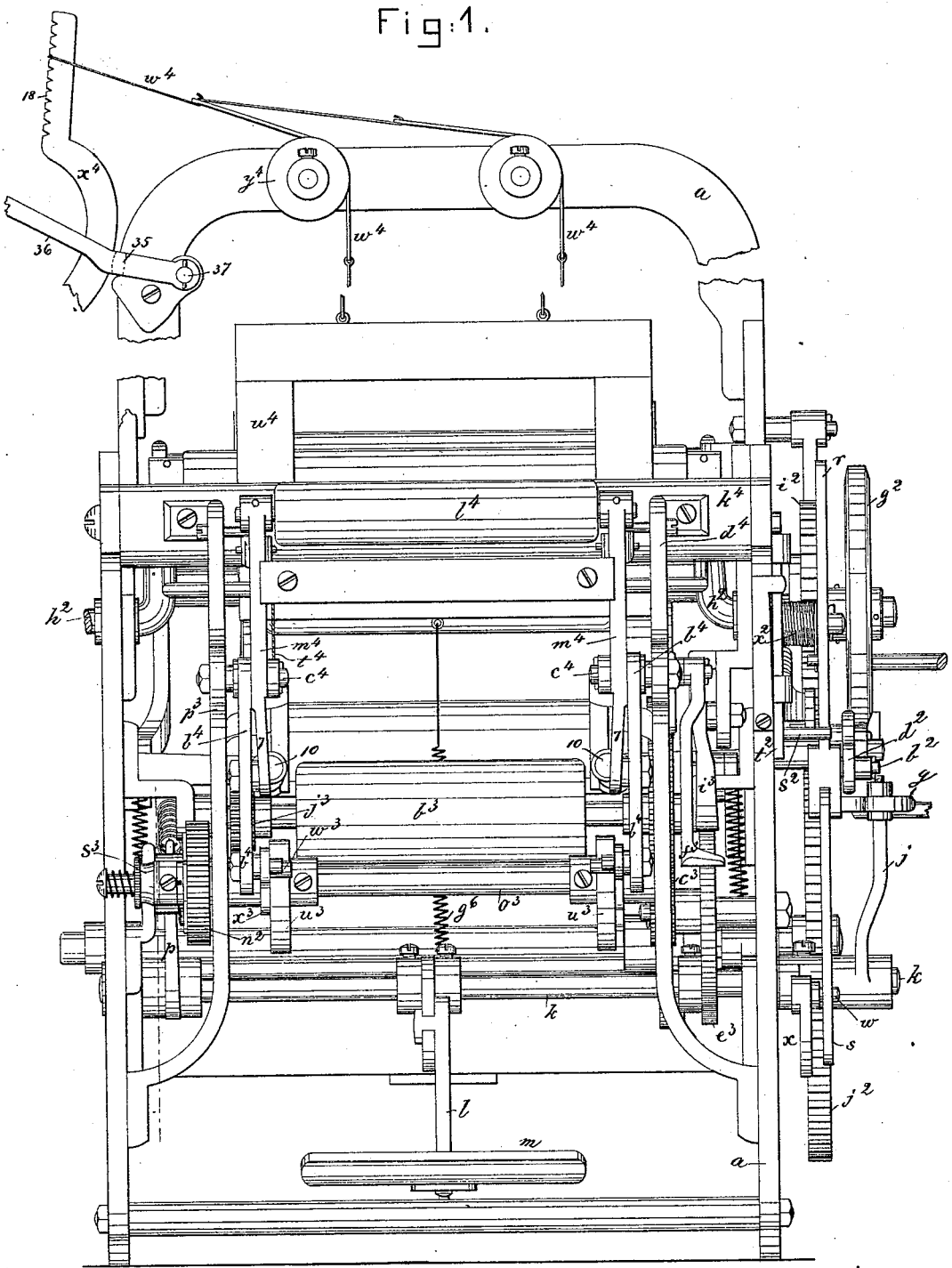
Figure 2:
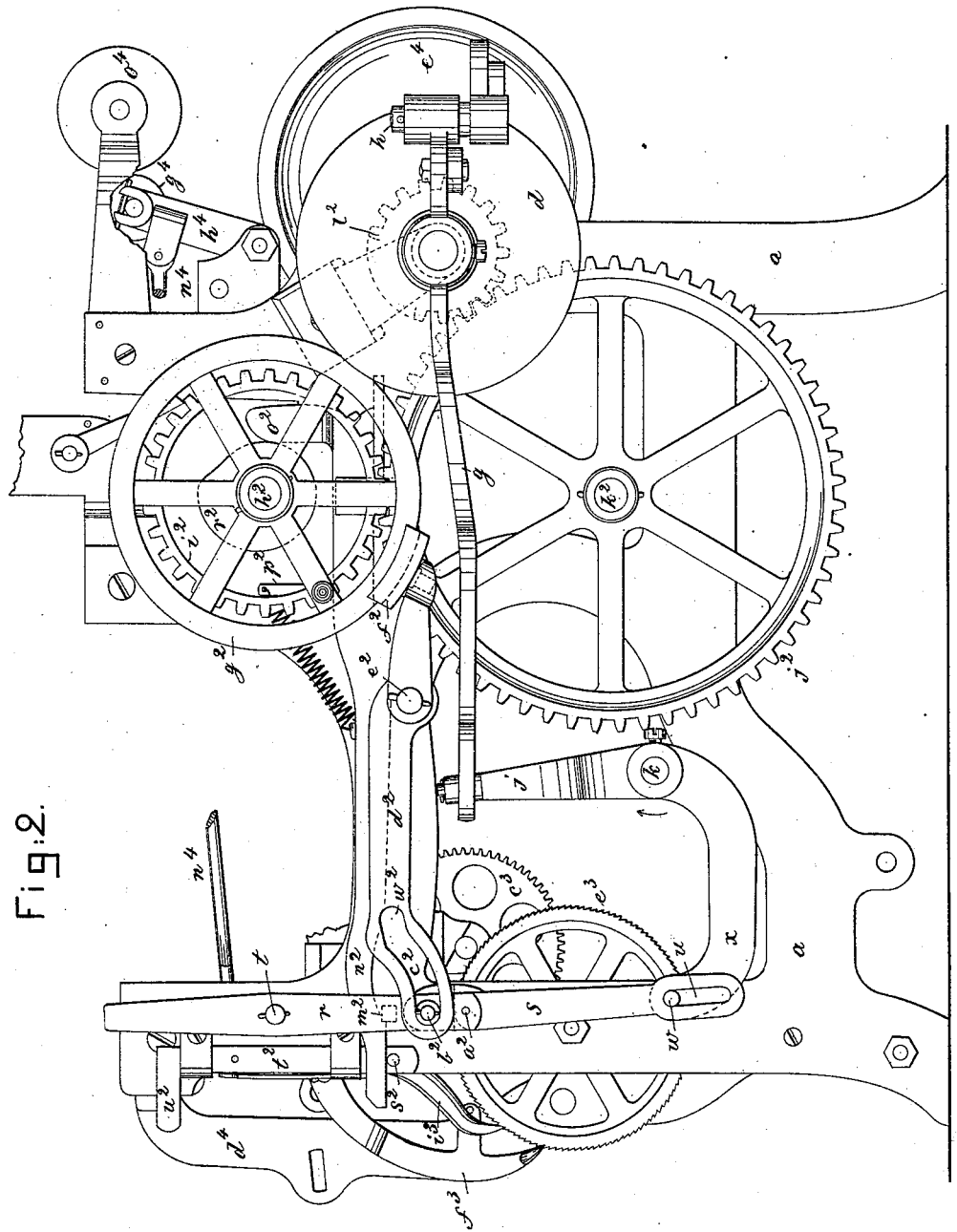
Figure 3:
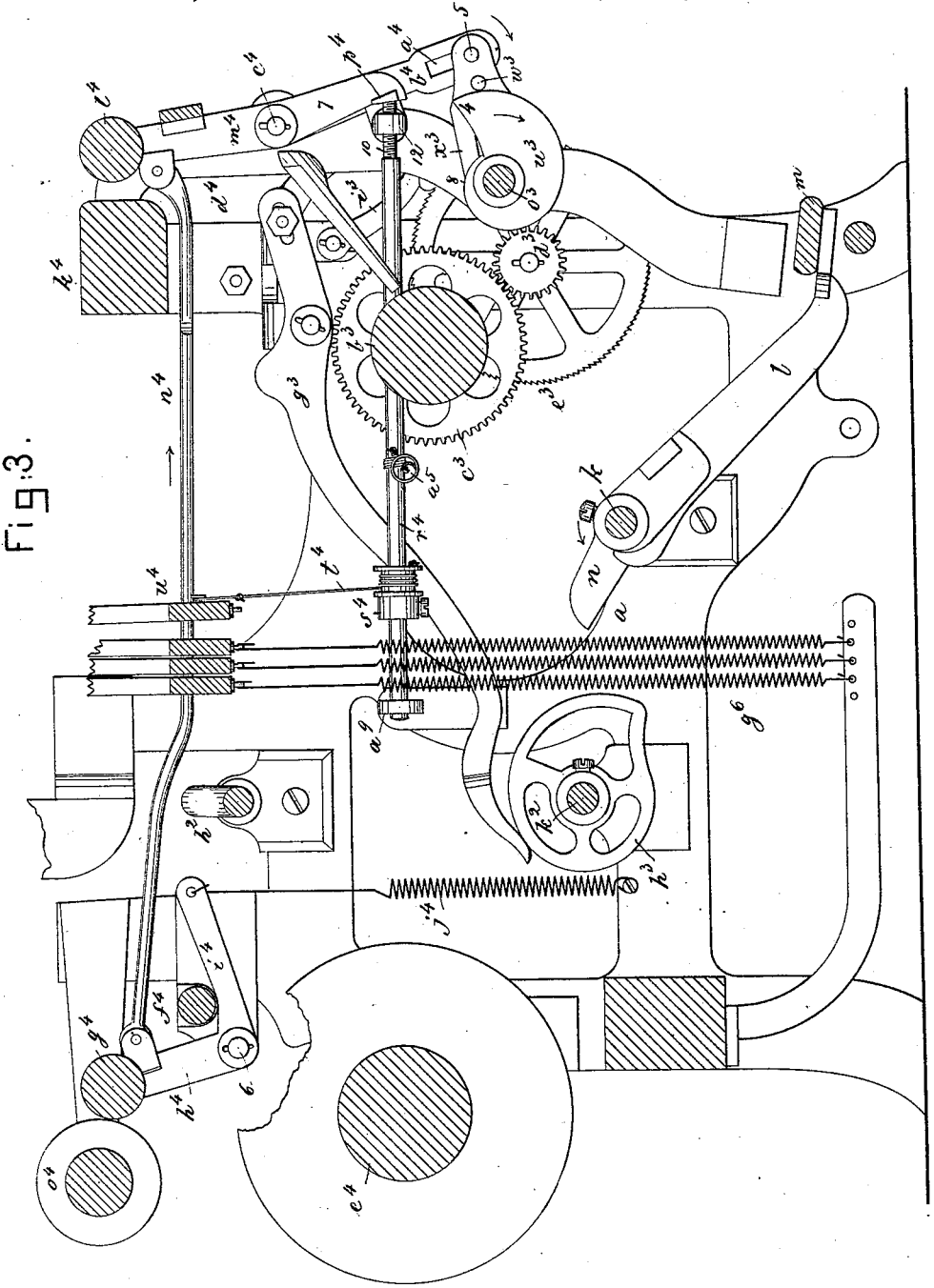

Figure 1 represents, in front elevation, a loom embodying our invention, the harness-lifting or dobby mechanism being broken away from the left of the drawings. Fig. 2 represents a right-hand side elevation of the loom, the harness-operating mechanism being omitted: Fig. 3, a longitudinal vertical section of that part of the loom shown in Fig. 2; Fig. 4, a top view of the right-hand end of the loom, the friction-clutch or driving-pulley being in section; Fig. 5, a detail of the front of the loom, showing the mechanism for regulating the formation of the loops for Turkish toweling and determining the occurrence of open spaces in the warps for fringe, and also a detail of the double intermediate gearing set in motion from the cloth-roller; Fig. 6, a section of Fig. 5 on the line $x\ x$. Figs. 7 and 8 are views of the harness-lifting or dobby mechanism removed from Fig. 1, the views being the one an elevation and the other a section thereof, the loom being viewed from its rear or let-off end. Fig. 9 represents the harness-operating mechanism viewed from the side of the loom, the clutch on the pattern-cylinder shaft being shown in section. Fig. 10 is a top view and section of one of the notched jacks; Fig. 11, a modification of arm for the drawing roller or beam when only ordinary toweling is to be made; Fig. 12, a detail of the pattern-surface clutch; and Fig. 13, detail of pattern-chain.

The loom-frame $a$ may be of any proper shape to support the working parts.

The driving-shaft $b$ of the loom (see Fig. 4) has keyed or fixed upon it one-half, $c$, of a friction driving-pulley, the other half, $d$, to which the driving-belt is applied, running loose upon the said shaft, but being moved at the proper times into and out of engagement with the conical half $c$, so as to start or cease to drive the said shaft $b$, as may be desired.

The half $d$ has a collar, $e$, against which operates the finger $f$, adjustably connected with the clutching and unclutching lever $g$, pivoted at $h$ and slotted diagonally at its forward end, as at $i$, to receive the upper end of arm $j$ or a roller thereon, the said arm projecting from the said shaft $k$, provided with a treadle, $l$, having a foot-board, $m$, by which, when the shaft is moved in a direction opposite the arrow near it in Fig. 2, will cause the arm $j$, acting in the slot $i$, to place the halves $c\ d$ of the clutch in operative contact.

A lug, $n$, on the shaft $k$ (see Fig. 3) strikes the frame $a$, and prevents the shaft being turned too far back in the direction of the arrow, Figs. 2 and 3, by a spring, $o$, which connects another arm, $p$, of the shaft $k$ with a fixed part of the frame, the said spring serving also to turn the shaft $k$ and release the friction-clutch pulleys when the knuckle-jointed shipper-lever $r\ s$, pivoted at $t$ on the loom-frame, and slotted at $u$ to receive a pin, $w$, of the arm $x$ of the rocker-shaft $k$, is sprung backward from the straight-line position, Fig. 2, the said knuckle-jointed lever $r\ s$, when in the position shown in Fig. 2, acting upon the pin $w$ to hold the arm $j$ forward and the clutches together.

The two parts $r\ s$ of the shipper-lever are pivoted together at $a^2$, and at one side the part $r$ has a pin, $b^2$, to enter a curved slot, $c^2$, in a brake-lever, $d^2$, pivoted at $e^2$, the said lever having a brake-shoe, $f^2$, which is adapted to be forced by the pin and slot against the periphery of the fly-wheel $g^2$ of the crank-shaft $h^2$, which is provided with a toothed wheel, $i^2$, that is engaged and set in motion by a toothed wheel, $j^2$, on the usual cam-shaft $k^2$, actuated by the toothed wheel $l^2$ on the shaft $b$.

When weaving patterns it is very desirable to be able to stop the loom at each pick. In this loom we have provided mechanism to stop the loom after each pick, if it is so desired, and have arranged a treadle or equivalent which, when vibrated or depressed, starts the loom after each dwell.

When the lever $r\ s$ is straight the loom operates regularly, but when bent or thrown back the loom is suddenly arrested. This we do automatically in the following way: The part $r$ has at its rear side a pin, $m^2$, and above it is a reciprocating shipper-moving bar, $n^2$, having two arms, $o^2\ p^2$, which are struck by a cam, $r^2$, on the shaft $h^2$.

The forward end of bar $n^2$ rests upon a pin or projection, $s^2$, on or forming part of a leg, $t^2$, having a lifting-handle, $u^2$, and connected with the loom-frame. This leg holds the hook of the bar $n^2$ up out of range of the pin $m^2$, but when lowered permits the said hook to engage the pin $m^2$ each time that the bar $n^2$ is moved toward the crank-shaft, thereby turning the lever $r\ s$ and permitting the spring $o$ to turn the shaft $k$ and its arm to disengage the friction-clutch, the pin $b^2$ at the same time, it moving in the curved part of the slot $c^2$, forcing the shoe against the wheel $g^2$.

If the lever $r\ s$ is moved farther backward by hand so as to place the pin $b^2$ in the straighter part of the slot, as shown at $w^2$, the lever $d^2$ will be moved so as to release the shoe, when the loom may be turned by hand to take out a mispick or correct any other error in weaving.

When the loom is to be started the foot is placed upon the treadle $m$, and the arm $x$ and pin $w$, aided by the spring $x^2$ (see Fig. 1) on pin $t$, the said spring being connected at one end with the part $r$, will act to straighten the lever $r\ s$ and operate lever $g$ to engage the clutch $c\ d$.

The lever $g$ (see Fig. 4) has a grooved pin, $a^3$, to conduct oil into the hollow hub of pulley $d$, to oil it that it may move easily upon the shaft $b$.

The cloth-roller or friction-drum $b^3$ has at one end a toothed wheel, $c^3$, which is engaged by a pinion, $d^3$, at the axis of the ratchet-wheel $e^3$, set in motion intermittingly by the pawl $f^3$, connected with the end of lever $g^3$, suitably pivoted upon the loom-frame and vibrated by the cam $h^3$, a detent, $i^3$, preventing the ratchet from rotating backward.

By changing gear $d^3$ for one having a different number of teeth, the number of picks to the inch of fabric may be varied. At its opposite end this cloth-roller has a pinion, $j^3$, which, through changeable intermediates $k^3\ l^3\ m^3$, (see detail, Fig. 5,) actuate the wheel $n^2$, which wheel has pins or projections 2 3, that act, as do the pins or projections $x^6$ in United States Letters Patent No. 197,754, December 4, 1878, to automatically determine the shifting of the shuttle-boxes when the border of a towel or other fabric is being woven, the said pins or projections being intended to operate upon like devices and as described in the said patent, to which reference may be had.

The length of the towel may be varied by changing the intermediates $k^3\ l^3\ m^3$ for others larger or smaller.

The wheel $m^2$ is mounted loosely upon the fringing-shaft $o^3$, between the bracket $p^3$ and a collar, $r^3$, fixed to the shaft; and a sleeve, $s^3$, on the said shaft $o^3$ has a pin, $t^3$, which affixes the wheel to the collar on the shaft, so as to move the shaft as the wheel $n^2$ is rotated, or to permit the wheel to be loosened, so as to turn the shaft $o^3$ by hand, if desired, so as to set its cams $u^3$ at just the proper position, according to the requirements of the material being woven, or when adjusting the parts after correcting imperfections in the weaving, to thereby insure towels of the same length.

These cams $u^3$ are so shaped, and the shaft $o^3$ is rotated at such speed, as to cause the toes 4 of the cam to pass from contact with the pins $w^3$ of slides $x^3$, which are adjustably connected by means of pins 5 with the slotted portions $a^4$ of arms $b^4$, pivoted at $c^4$ on the bracket $p^3\ d^4$, at the completion of each towel or napkin, or just as the last row of weft for the towel is laid into the warps.

Adjustment of pin 5 in slot $a^4$ and the radius of cam $u^3$ at its longest part provide for varying the length of fringe to be drawn through the harness-eyes.

For weaving Turkish toweling, the coarsest or body warp will be extended from the warp-beam $e^4$ over the guide-roll $f^4$, thence over the warp-giving roller or beam $g^4$, mounted upon levers $h^4$, pivoted at 6, and having, as herein shown, arms $i^4$, with which are connected strong springs $j^4$, or their equivalents, weights, the said springs or weights acting to throw the roller $g^4$ toward the breast-beam. From roller $g^4$ (or it may be a beam) the said body-warp is extended through the usual harness or heddle eyes and reed-spaces over the breast-beam and the cloth-drawing roller $l^4$ to the cloth-roller $b^3$.

The roller $l^4$ (but it might be a beam) is shown (see Fig. 3) as supported at the upper ends of arms $m^4$, pivoted at $c^4$, and the lower ends, 7, of the said arms $m^4$ are extended down but for a short distance, to be operated upon by loop-governing mechanism, as for the manufacture of Turkish toweling; but for damask or Jacquard figured toweling, the said arms will be extended down far enough to be acted upon by the cams $w^3$, as in Fig. 11, or be connected directly with the slide $x^3$. These levers $h^4$ and arms $m^4$ and their rollers $g^4$ $l^4$, at the back and front of the loom, and connected together by the connecting-rod $n^4$ with the cams $w^3$, constitute the essential elements of the fringing mechanism.

The tendency of spring $j^4$ is to crowd the rod $n^4$ in the direction of the arrow, Fig. 3, and throw the rollers $g^4$ $l^4$ forward automatically and quickly whenever the toes 4 of the cams $w^3$ arrive in such position as will permit the lower ends of the arms which carry roller $l^4$ to move toward shaft $o^3$, said movement of the two rollers drawing the warps quickly forward through the harness-eyes and reed-spaces in the direction of the movement of the cloth in weaving, and for a distance according to the length of the fringe to be produced.

The warp so far described is held under considerable tension, and the tension is not varied, nor is the let-off or take-up changed or disarranged when the rollers $g^4$ $l^4$ are so moved forward, or when they are subsequently gradually moved backward in opposition to the movement of the cloth in weaving, which is the case after each length of fringe is formed, the cams $w^3$ then operating from their heels 8 toward their toes 4.

The warp for the looped portion of Turkish toweling is passed from warp-beam $o^4$ over roller $g^4$, and through the harness-eyes, &c., as described, of the other warp; but it is held quite slack or but with little tension, so that it, when bound to the body-warp by the usual filling or weft, may at every third or other pick be looped as a pile or be shirred upon the body-warp.

To do this looping of the Turkish warps the two rollers $g^4$ $l^4$, with the body or main warp held taut thereon, are at, say, every third pick thrown forward toward, and then backward from, beam $o^4$ by loop-forming mechanism independent of the cams $w^3$, which form the fringe at the end of the towel, such movement taking place as the weft uniting the two warps is being beat up by the usual reed. In the drawings, Fig. 5, we have shown these devices for so moving the rollers $g^4$ $l^4$ independently of cams $w^3$.

The lower end of arm 7 is in said figure shown as provided with a lug, $p^4$, which is acted upon by the end of a screw-shaft, $r^4$, having a pulley or drum, $s^4$, upon which is a cord, $t^4$, attached, as shown in the said figure, to a harness-frame, $u^4$, which, by cording $w^4$, (see Fig. 1,) is connected with one of the upright levers $x^4$, whereby the said shaft, through the said lever $x^4$, may be turned in one direction according to the presence or absence of pins of the pattern surface or chain which determine the times of movement of levers $x^4$.

It is obvious that the cord $t^4$ might be passed over pulley $y^4$ directly to the lever $x^4$. These shafts $r^4$, preferably one at each side of the loom, have screw-threaded ends 10, which screw into lugs 12 on arms $b^4$, and each time that the shafts are turned by the pattern-surface and its connections therewith the ends 10, acting upon the ends 7 of arms $m^4$, move the said arms and rollers $l^4$ $g^4$ backward, the spring $a^5$, which connects the two shafts $r^4$, turning them in opposition to the movement of the pattern-surface; this frequent movement of the said rollers $g^4$ $l^4$ and arms—say, after each third pick—continuing at the same time that the cams $w^3$ operate to gradually and steadily move the said rollers $g^4$ $l^4$ backward, as is necessary for the fringed end.

By changing the pattern-surface this piling or looping mechanism for Turkish toweling may be operated at any desired intervals, so as to make a close pile from end to end, or only at intervals for a greater or less number of picks.

The looping mechanism may be employed in a machine not provided with mechanism for drawing the warp for fringe.

If the towel is to be woven with a Jacquard or damask pattern, the slack-tension warp, the roller $o^4$, the shafts $r^4$, cords $t^4$, and arms $b^4$ may be omitted, and the lower portions, 7, of arms $m^4$ be extended down far enough to be directly connected with the slides $x^3$, or be directly operated upon by the cams $w^3$.

At the commencement of each towel the pin $w^3$ or the end of the arm carrying the roller $l^4$ will rest on the heel 8 of cam $w^3$.

The devices shown by us for supporting the woven cloth and warp upon independent cloth-drawing and warp-giving rollers connected together and made to move forward in unison and automatically, to thereby quickly draw through the harness-frames and reed-spaces any desired amount of warps for a fringe of the required length, and then to begin weaving for another towel, may, it will be obvious to skilled weavers, be variously modified as to mechanical construction without departing from our invention, and may be employed in connection with the production of all fabrics in which it is desired to form a fringe from the warp.

The harness-frame-lifting devices are contained in the head $b^5$, properly bolted to the frame $a$.

The shaft $c^5$ of the pattern surface or chain $d^5$ has upon it a loose pinion, $e^5$, provided with a series of side notches, (see Fig. 12,) which are engaged by the wedge-shaped end 13 of a clutch, $f^5$, pivoted upon a collar, $g^5$, fixed to the shaft $c^5$, the clutch being pushed forward into engagement with one of the notches of pinion $e^5$ by a spring, $h^5$.

The operator, by means of the hand-wheel $i^5$, fixed on shaft $c^5$, may turn the said shaft with sufficient force to overcome the frictional engagement of the clutch with the pinion $e^5$, and the pattern-surface may be turned by itself in either direction, as may be desired.

The pattern-cylinder is driven from the crank-shaft by the pinion $j^5$, toothed wheel $k^5$, shafts and bevel-gears $l^5$ $m^5$, and a worm, $n^5$.

The toothed wheel $k^5$ has a crank-pin, $o^5$, which, by link $p^5$, causes the three-armed lever $r^5$ to be vibrated, so as to reciprocate the lifters $s^5$ $t^5$, connected thereto by link $u^5$ $w^5$ in opposite directions, the said lifters moving in and being guided by slots or ways $x^5$, one lifter moving out for one pick and the other out for the next pick of the shuttle.

The fingers $a^6$, pivoted at 14, are vibrated by the presence and absence of pins upon the pattern-surface, the said pins being so located in the chain that one row governs one set of jacks and the next row the other set of jacks.

Each finger, at its short end, (see Fig. 8) has resting upon it a guided rod or jack selector $b^6$, provided with two collars, 15 16, one below each of the notched jacks $c^6$ $d^6$, there being one of each of said jacks to each connector or arm $f^6$, and each connector $f^6$ is pivoted at 17 upon one of the levers $x^4$, which are upright, and notched at 18 for the adjustable connection with said levers of the harness-cording $w^4$, which extends to the harness-frames, to enable them to be raised to various heights to even or level the warp-threads in each half of the shed. Should these notches be omitted the lifters would have to be moved angularly, which would tend to move the notched jacks laterally one against the other, thereby producing friction; would tend to bend the rods $b^6$, and the jacks so crowded laterally would frequently slip from the lifters.

Springs $g^6$ depress the harness-frames.

The levers $x^4$ are placed in vertical position, so that when moved they, at the ends of their movement, have less vibration or spring than would be the case if the arms of $x^4$, with which the harness-frame cords are connected, were in a horizontal position.

Placing the levers $x^4$ in vertical rather than in a horizontal position enables us to run the loom very much faster, which is a matter of very great importance, and also enables power to be saved.

The levers $x^4$ are slotted at 19 (see Fig. 8) to embrace their fulcrum-rod 20, and the rod 21, in the curved slots 23, holds the levers up to their fulcrum-rod.

Each jack is provided with a notch or hook at its lower side. The rod $b^6$ is extended through slots 22 in each jack $c^6$ $d^6$, and each rod operates to lift one of the two jacks $c^6$ $d^6$ of one connector at the proper time, and each rod is lifted by its own finger.

If a rod and finger were used for each jack the jacks, levers, and harness-frames could not be placed so closely together, and, besides difference in cost of extra parts, more power would be required.

At each extreme backward position of each lifter all the hooked jacks above it which are not held up by the collars on the rods $b^6$ are permitted to fall into engagement with the lifters then about to start out.

At the upper and lower ends of the connectors $f^6$ are fulcrum-bars 23 24, against which both ends of the said connectors always rest when the hooks of the jacks are not in engagement with the lifters.

Referring to Fig. 8, suppose the hook of the first jack, $c^6$, in engagement with the lifter $s^5$. Outward movement of the said lifter will draw the lower end of the connector $f^6$ outward, and its upper end, resting against 24, will turn lever $x^4$ on its fulcrum 20 and lift its connected harness-frame. In the said Fig. 8 one of the upper hooked jacks $d^6$ (the second one) is shown engaged with the lifter $t^5$, and its connector $f^6$, drawn out at its upper end, rests at its lower end against 23, and the lever upon which the said connector is pivoted is lifted. When both the hooked jacks of one connector are not engaged by an outwardly-moving lifter, the said connector bears at bottom and top upon the fulcrum-bars 23 24, and the lever $x^4$, upon which the said connector is pivoted, remains down, or with its harness-frame depressed. The hooks of the jacks drawn out remain in engagement with the lifter as the latter is moved backward, and the harness-frames are permitted to descend gradually.

When the jacks $c^6$ $d^6$ of any one connector are engaged with both lifters, they moving in opposite directions, the lever $x^4$ of that connector will be held elevated, and the upper and lower ends of the said connector will be held away from 23 24.

The pins or projections 2 3 constitute what we herein denominate "border-determining devices," for they regulate the shuttle-boxes for the border.

The pattern-chain $d^5$ is composed of a series of bars, 26, (see detail, Fig. 13,) and each bar, at its opposite ends, has a rigidly-projecting arm, 27, which is connected loosely with the adjacent reduced end of another bar, and opposite the rigid arms the bars are connected at their ends by means of links 29, loosely attached to each. This construction enables the bar whose pins are coming into position and acting upon the lower sides of the fingers to be steadied by the other bar and the said rigid arm, so that the bar cannot be rocked or tipped as its pins commence to act.

The bars fit notches 30 in the lanterns 31.

Instead of moving the rollers $g^4$ $l^4$ from cams at the extreme front of the loom, it is obvious that the said cams may be on a shaft at the back of the loom, the said shaft being driven by suitable gearing between it and the shaft of roller $b^3$. In such case the said cams would preferably act upon the ends of arms $i^4$.

The evener 35, projecting from an arm, 36, pivoted at 37 upon the frame $a$, may be turned as shown in Fig. 1, and be made to act upon the rear sides of the levers $x^4$, and even all the warp-threads, when it is desired to mend a broken warp, or for other purposes.

In order that the bars of the pattern-chain may be lifted from the notches in the lantern 31, which receive and move the bars, we have placed under the pattern-chain certain chain-lifters 38, the outer free ends of which act to lift the bars of the chain from the notches 30.

We claim—

1. In a loom, the notched upright harness-lever $x^4$, attached by cording to a harness-frame, combined with a connector, $f^6$, pivoted upon the said lever between its ends, a hooked jack, $d^6$, at each end of the said connector, a single lifting-rod, $b^6$, provided with two collars to operate upon both the said jacks, the pattern-surface to move the lifting-rod, and two lifters and mechanism to operate them, as and for the purpose described.

2. In a loom, connected cloth-drawing and warp-giving rollers or supports, and mechanism adapted to move them longitudinally together in unison and draw the warps through the harness-eyes and reed to form unwoven spaces in the warps at desired intervals, for the production of a fringe, substantially as described.

3. A cloth-drawing roller or support located between the breast-beam and take-up roller, combined with the breast-beam and take-up roller, and with a rotating cam and intermediate devices between it and the cloth-drawing roller or support to move it in opposition to the movement of the cloth in weaving, and to permit the roller, a towel of the desired length having been woven, to be suddenly moved in the opposite direction to draw enough warp through the harness-eyes and reed to form a fringe, substantially as described.

4. In a loom, connected warp-giving and cloth-drawing rollers located upon the loom to support the warp between the warp-beam and harness-eyes, and to support the cloth between the breast-beam and cloth-roller, combined with piling or looping mechanism, substantially as described, and a pattern-surface to control it, to thereby automatically move the body-warps supported by the said warp-giving and cloth-drawing rollers backward, and with mechanism to move them forward to enable the loosely-held piling or looping warp to be looped or shirred upon the body-warps for the formation of Turkish toweling, substantially as set forth.

5. The warp-giving and cloth-drawing rollers and their connected arms, combined with the screw-rods $r^4$ and mechanism to rotate them in opposite directions, substantially as described.

6. The cloth-drawing roller or support $l^4$ and its carrying-arms and piling or looping mechanism, substantially as described, to move the said arms and roller at the necessary intervals to produce loops for Turkish toweling, combined with arms $b^4$, and cams and mechanism to operate them and the said roller and its arms, to assist in forming a warp-fringe at the end of a towel or fabric, substantially as described.

7. The arms $b^4$ and the adjustably-connected arms $x^3$, combined with the fringing-cams and mechanism to rotate them, as described, to provide for changing the length of the fringe at the end of a towel or other woven article, substantially as set forth.

8. The toggle-lever $r\ s$ and its pin $b^2$, combined with the brake-lever $d^2$, slotted at $c^2$, its shoe, and wheel $g^2$, substantially as described.

9. The toggle-lever $r\ s$ and its pin $b^2$, combined with the brake-lever, slotted as at $c^2\ w^2$, the pin of the said toggle-lever being adapted, when in the main part of the said slot, to turn the brake-lever and force its shoe against the fly-wheel, and when in the part $w^2$ of the said slot to move the brake-lever in the direction to release the shoe from the said fly-wheel, substantially as described.

10. The combination, in a loom provided with a friction-clutch and a treadle mechanism to engage the parts of the clutch to start the loom, of a shipping-lever, a brake-mechanism, and a shipper-moving bar to operate the shipper at each rotation of the crank-shaft and stop the loom after each pick, substantially as described.

11. The clutch-pulley, lever $g$, provided with slot $i$, and the lever $s$, combined with the rock-shaft, its treadle, and arms $j\ x$ and pin $w$, the end of arm $j$ entering the slot in the lever $g$, and holding the clutch-pulley closed while the pin $w$ is acted upon by the lever $s$, substantially as described.

12. The shipper-lever $r\ s$ and pin $m^2$, and reciprocating hooked bar operated in unison with the crank-shaft, combined with the leg to lift or lower the hooked bar at will, and lever $g$ and intermediate connections to move it, substantially as and for the purpose described.

13. The cloth-roll and fringing-shaft $o^3$ and its cams, combined by means of gearing, substantially as described, whereby the fringing-cams are operated from and in unison with the cloth-roller, substantially as described.

14. The pattern-chain, composed of bars provided with a rigidly-connected arm adapted to be connected loosely with adjacent bars, and of links which connect the opposite ends of the bars loosely, all substantially as described.

In testimony whereof we have hereunto signed our names to this specification in the presence of two subscribing witnesses.

GEO. CROMPTON.
HORACE WYMAN.

Witnesses:
J. B. SYME,
J. A. WARE.